(12) United States Patent
Zuev et al.

(10) Patent No.: US 8,171,391 B2
(45) Date of Patent: *May 1, 2012

(54) METHOD OF DESCRIBING THE STRUCTURE OF GRAPHICAL OBJECTS

(75) Inventors: Konstantin Zuev, Moscow (RU); Diar Tuganbaev, Moscow (RU); Irina Filimonova, Moscow (RU)

(73) Assignee: ABBYY Software, Ltd, Nicosia (CY)

( * ) Notice: Subject to any disclaimer, the term of this patent is extended or adjusted under 35 U.S.C. 154(b) by 1151 days.

This patent is subject to a terminal disclaimer.

(21) Appl. No.: 11/556,196

(22) Filed: Nov. 3, 2006

(65) Prior Publication Data

US 2008/0109403 A1  May 8, 2008

(30) Foreign Application Priority Data

Jan. 25, 2006  (RU) .............................. 2006101908

(51) Int. Cl.
*G06F 17/27* (2006.01)
*G06K 9/34* (2006.01)

(52) U.S. Cl. .................. 715/222; 382/171; 382/176
(58) Field of Classification Search ............... 715/222
See application file for complete search history.

(56) References Cited

U.S. PATENT DOCUMENTS

| | | | |
|---|---|---|---|
| 5,251,273 A | 10/1993 | Betts et al. | |
| 5,317,646 A * | 5/1994 | Sang et al. | 382/175 |
| 5,416,849 A | 5/1995 | Huang | |
| 5,434,962 A * | 7/1995 | Kyojima et al. | 715/234 |
| 5,822,454 A * | 10/1998 | Rangarajan | 382/180 |
| 5,864,629 A * | 1/1999 | Wustmann | 382/135 |
| 6,400,845 B1 * | 6/2002 | Volino | 382/176 |
| 6,507,671 B1 * | 1/2003 | Kagan et al. | 382/173 |
| 6,687,404 B1 | 2/2004 | Hull et al. | |
| 6,694,053 B1 | 2/2004 | Burns et al. | |
| 7,149,347 B1 * | 12/2006 | Wnek | 382/159 |
| 7,149,367 B2 * | 12/2006 | Cutler | 382/284 |
| 7,171,615 B2 * | 1/2007 | Jensen et al. | 715/222 |
| 7,225,197 B2 * | 5/2007 | Lissar et al. | 707/102 |
| 7,310,635 B2 * | 12/2007 | Tucker | 707/3 |
| 7,346,215 B2 * | 3/2008 | Shih et al. | 382/232 |
| 2004/0190790 A1 * | 9/2004 | Zuev et al. | 382/291 |
| 2006/0104511 A1 * | 5/2006 | Guo et al. | 382/176 |
| 2007/0168382 A1 * | 7/2007 | Tillberg et al. | 707/102 |
| 2008/0195968 A1 * | 8/2008 | Schacht | 715/799 |
| 2009/0028437 A1 * | 1/2009 | Hirohata | 382/201 |

FOREIGN PATENT DOCUMENTS

WO   WO-98/47098   10/1998

* cited by examiner

*Primary Examiner* — Doug Hutton, Jr.
*Assistant Examiner* — Ariel Mercado
(74) *Attorney, Agent, or Firm* — John C. Meline

(57) ABSTRACT

The proposed technical solution allows processing of machine-readable forms of unfixed format. It comprises a method of specifying the logical structure of a document characterized by: preliminary specification of the list and descriptions of varieties of elements which may be present in the form, specifying an algorithm of setting the search constraints for every element, description of at least the following characteristics of search for every simple or compound element—the spatial characteristics of the search area and the parametric characteristics of the element, description of the method of identification of obtained elements, testing the type of the element, testing the properties which are typical of the type, testing the completeness of composition of the parts of the element.

6 Claims, 1 Drawing Sheet

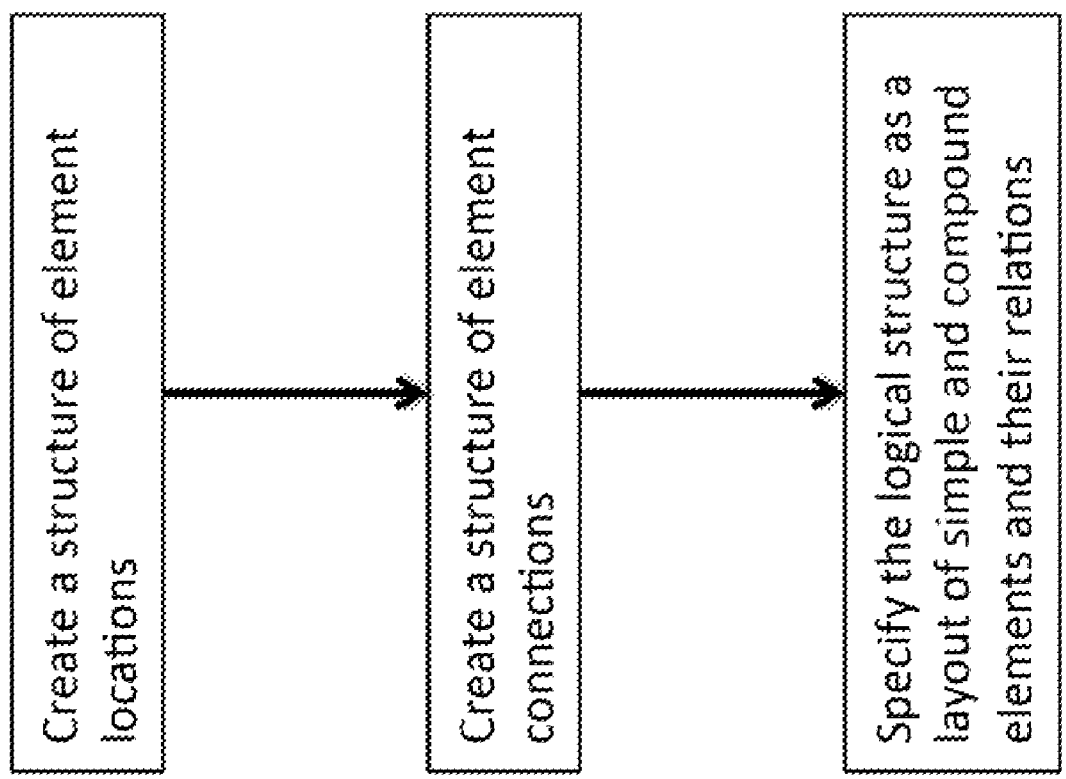

METHOD OF DESCRIBING THE STRUCTURE OF GRAPHICAL OBJECTS

FIELD

The present invention relates generally to image recognition and particularly to the recognition of non-text and/or text objects contained in a bit-mapped image of a document.

BACKGROUND

Methods of structure assignment and document element search in an electronic graphical image are known in the art (U.S. Pat. No. 5,416,849 Huang, May 16, 1995).

The capability of the known methods to process only fixed forms, not allowing deviations in field arrangement, is the shortcoming of the methods.

Anyone of the described methods and the system may be taken as a prototype.

The mentioned methods are also applied for, but not limited to, recognition of data input forms, containing typographical and hand-written texts as well as a set of special text-marks for document navigation. Documents as supposed herein are inquiry lists, questionnaires, bank documents with rigid or arbitrary arrangement of data fields.

The technical result consists in the improvement of electronic document elements searching and analyzing capabilities as well as the accuracy of identification of obtained image objects, the increase of noise immunity during the process of object search on the image.

The declared technical result is achieved by using flexible structural description (assuming the possibility of deviations from the fixed format), tools for assignment, search and identification of objects on an image; with further assignment of the estimate of correspondence of the search result to the description. Numbers from 0 to 1 are used for the evaluation. The accuracy of evaluation is 10.sup.−5 (ten to the power of minus five). The value equal to 1 means the absolute correspondence of the obtained result to the description. If the estimate differs from zero, the application of flexible structural description also comprises the stage of forming block regions, i.e. evaluation of the arrangement of the required fields on the basis of the information about the obtained objects.

Structural description comprises the description of spatial and parametric characteristics of document elements, and the logical connections between document elements.

The method of preliminary assignment of a document structure consists in setting a description of the document's logical structure in the form of interdependences of spatial and parametric characteristics of elements, algorithms of obtaining the parameters of the search for each element, methods of identifying the obtained elements, methods of decreasing the number of obtained variants of an element, acceleration of the search for the best variant.

BRIEF DESCRIPTION OF THE DRAWINGS

FIG. 1 shows a high-level flowchart of a method for specifying the logical structure for a form, in accordance with one embodiment

DETAILED DESCRIPTION

A set of spatial and parametric characteristics sufficient for search for and identification of an element is used to describe elements of a document of anon-fixed format. A structural description consists of a description of spatial and/or parametric characteristics of the element, and a description of its logical connections with other elements.

A flexible structural description may also additionally include all or some of the following conditions. The logical structure of a document is represented as a sequence of elements connected mainly by hierarchical dependences; an algorithm of determining the search parameters is set, spatial characteristics for searching for each element are specified, parametric characteristics of the searching for each element are set, the set of parameters for identifying a compound element on the basis of the aggregate of components is set, and an algorithm of estimating the quality of an obtained variant of an element is set.

A flexible structural description may also additionally include a separate brief structural description for determining the correct spatial orientation of the image.

A flexible structural description may also additionally include a separate brief structural description for determining the document type and selecting the corresponding comprehensive document description from several possible descriptions. A comprehensive description is created for each document type. If a document type does not have a brief description, then the comprehensive description of the document is used for selecting its type.

The essence of the invention consists in the method of preliminary assignment of a document logical structure in the form of a structural description and comprises creating a structure of element locations, creating a structure of element connections, and specification of the structure in the form of arrangement and connections of simple and compound elements.

The method specifies in advance a list and a description of varieties (types) of elements which may be present in the form. An algorithm of specifying the search parameters for each element is described. A set of at least spatial characteristics of the search area and/or parametric characteristics of the search for each simple and/or compound element is described.

A method of identifying the obtained elements, testing the element type, testing the properties typical of the present type, and testing the completeness of the composition of the element is described.

Testing the completeness of the composition of an element comprises estimation of the values of the absolute spatial characteristics of the element, estimation of the values of the relative spatial characteristics of the element, estimation of the values of parametric characteristics of the element, and a rule of assigning quality values to obtained elements and/or parts thereof.

A method or several methods of decreasing the number of analyzed variants of composition of a compound element and accelerating the search for the best variant are described.

Values of spatial and parametric characteristics may be represented as exact and/or interval values.

One or several earlier obtained objects, or any one or several obtained lines, or one or several points, or one or several borders of a document are mainly assigned as the starting point for calculating relative spatial characteristics.

The structure of element connection is mainly realized as a hierarchical structure.

A method of decreasing the number of variants of composition of a compound element comprises the following actions. A limited number of assigned variants with the best quality are kept for further consideration. Other variants are discarded. A search for the best variant of the compound element is performed, taking into account the best total quality of the analyzed components, regardless of their number. The total quality of the compound element is calculated as a product of the quality ratings of the simple and/or compound elements composing it.

The coordinates may be specified as exact values or as an interval.

A separate structural description is set to detect the spatial orientation of an object. Such a description usually contains a brief set of structural elements which can be easily recognized on a document (form). Orientation is accepted as correct if the elements of the structural description coincide with the elements on the image with the best quality estimate.

A corresponding separate brief description is set for quick detection of the type of a recognized document and selecting the comprehensive (main) description of the document type from several possible descriptions. A comprehensive description is created for each document type. If any document type does not have a brief description, then the comprehensive description of the document is used for selecting its type, and the selection of the document type is performed by comparing the quality estimates of the used (brief or comprehensive) descriptions of different types.

Creation of the flexible structural description uses the following main types of elements conventionally divided into the following: simple element which do not contain other elements: Static Text, Separator, White field, Barcode, Text String, Text Fragment, Set of objects, Date, Phone Number, Currency, and Table, and compound elements—Group, and some other types.

Static text, as supposed herein, is an element of structural description describing a text with the known meaning. The text may consist of one word, of several words, or of an entire paragraph. "Several words" differs from "a word" by the presence of at least one blank space or another inter-word separator, depending on the language, for example, a full stop, a comma, a colon, or any other punctuation mark. Several words may take up several text strings.

Separator, as supposed herein, is an element representing a vertical or horizontal graphical object between other objects. A separator can be represented, for example, by a solid line or a dotted line.

White field, as supposed herein, is an element of description representing a rectangular region of an image which does not contain any objects within it.

Barcode, as supposed herein, is an element of flexible description representing a line drawing which codes numerical information.

Text string, as supposed herein, is an element representing a sequence of characters located on a single line one after another. Character strings can consist of text objects, for example, words, or of fragments of text objects.

Text fragment, as supposed herein, is an element representing an aggregate of text objects.

Set of objects (of the specified type), as supposed herein, is an element representing an aggregate of different types of objects on an image, where each object meets the search constraints.

Date as supposed herein, is an element representing a date.

Telephone number, as supposed herein, is an element representing a telephone number which may be accompanied a by prefix ("tel.", "home tel.", etc.) and by a code of the city/region, which is separated from the number by brackets.

Currency, as supposed herein, is an element of description representing money sums, where the name of the currency can be used as the prefix.

Table, as supposed herein, is an element of flexible description representing data in the form of a table.

Compound element (element group), as supposed herein, is an aggregate of several elements (sub-elements). Sub-elements may be simple or compound.

Compound elements are used for:
joining elements into a group. Each of these compound elements may contain smaller compound elements which search for smaller fragments of the element;
providing the logical hierarchy of elements for better navigation through the structural description;
reducing the number of possible variants of the element in order to speed up the search for the resulting variant. Joining elements into a compound element allows to analyze this set of sub-elements as a single entity which has its own complete variant (consisting of the variants of the sub-elements) and a total estimate of reliability of the entire group. Revision of possible combinations of variants of the sub-elements is performed within the group, and only a predefined number of the best variants in the group take part in the further analysis and search for the next elements. The number of the best variants of a compound element which take part in further searching is usually 1;
specifying restrictions of the search area which are common for all the sub-elements. The search area of a certain sub-element in this case is calculated as the intersection of the search area set for the sub-element itself and the search area of the group which contains this sub-element.

The invention claimed is:

1. A computer-implemented method of specifying the logical structure for a form, comprising:
   creating a structure of element locations;
   creating a structure of element connections; and
   specifying the logical structure as a layout of simple and compound elements and their relations comprising:
   (a) a list and description of varieties of elements detectable on the form;
   (b) an algorithm of specifying search constraint for each element;
   (c) a set of at least the following characteristics of searching for each simple and compound element:
      (1) spatial characteristics for a search area;
      (2) parametric characteristics of the element, and
   (d) a method of identifying each element, testing a type of the element, testing distinctive properties based on element type, and testing completeness of composition of parts of the element, based on:
      (1) values of absolute spatial characteristics of the element,
      (2) values of relative spatial characteristics of the element;
      (3) values of parametric characteristics of the element;
      (4) a rule of assigning quality ratings to obtained elements; and
      (5) a method of decreasing a number of variants of a composition of a compound element, and a method of accelerating the search for the best variant.

2. A method of specifying the logical structure of a document, as recited in claim 1, where the spatial characteristics of an element are included in the set of characteristics for the search for this element.

3. A method of specifying the logical structure of a document, as recited in claim 1, where the spatial and parametric characteristics are represented as exact values and/or as intervals.

4. A method of specifying the logical structure of a document, as recited in claim 1, where one or several earlier obtained objects, or any one or several obtained lines, or one or several points, or one or several borders of the document are assigned as the reference points for the relative spatial characteristics.

5. A method of specifying the logical structure of a document, as recited in claim 1, where the hierarchical structure of connections between the elements is set.

6. A method of specifying the logical structure of a document, as recited in claim 1, where the method of decreasing the number of variants of the composition of a compound element comprises:

assigning a number of variant with the best quality estimates which will be kept for further analysis to each type of the element;

performing a search for the best variant of a compound element, taking into account the best total quality of its accountable composite parts, regardless of their number.

* * * * *